United States Patent
Doetsch et al.

(10) Patent No.: US 6,547,490 B2
(45) Date of Patent: Apr. 15, 2003

(54) COATED METAL PEROXIDES

(75) Inventors: Werner Doetsch, Linz a. Rhein (DE); Gabriele Wasem, Hausen (DE)

(73) Assignee: Solvay Interox GmbH, Hannover (DE)

( * ) Notice: Subject to any disclaimer, the term of this patent is extended or adjusted under 35 U.S.C. 154(b) by 0 days.

(21) Appl. No.: 09/907,446

(22) Filed: Jul. 18, 2001

(65) Prior Publication Data

US 2002/0051744 A1 May 2, 2002

(30) Foreign Application Priority Data

Jul. 18, 2000 (DE) .......................... 100 35 287

(51) Int. Cl.[7] .................................. G05B 7/00
(52) U.S. Cl. .................... 405/128.5; 405/427; 405/216; 405/423; 405/582; 405/205; 405/333; 405/405; 405/128.15; 405/128.75
(58) Field of Search .................. 405/128.5, 128.15, 405/128.75; 427/216; 423/582; 205/333

(56) References Cited

U.S. PATENT DOCUMENTS

| 3,917,663 A | * | 11/1975 | Kegelart et al. ......... 423/415.2 |
| 4,293,426 A | | 10/1981 | Gago |
| 4,321,301 A | * | 3/1982 | Brichard et al. ............ 423/275 |
| 4,399,633 A | * | 8/1983 | Haughey et al. .............. 34/339 |
| 4,427,644 A | | 1/1984 | Doetsch et al. |
| 4,470,839 A | * | 9/1984 | Gago .......................... 427/213 |
| 4,867,902 A | | 9/1989 | Russell |
| 5,264,018 A | * | 11/1993 | Koenigsberg et al. ... 435/262.5 |
| 5,312,557 A | * | 5/1994 | Onda et al. ............. 252/186.32 |
| 5,346,680 A | * | 9/1994 | Roesler et al. .............. 423/274 |
| 5,395,419 A | * | 3/1995 | Farone et al. ............ 435/262.5 |
| 5,681,807 A | * | 10/1997 | Honing et al. ......... 252/186.25 |
| 5,690,701 A | | 11/1997 | Bigini et al. |
| 5,703,034 A | * | 12/1997 | Offshack et al. ............ 510/220 |
| 6,106,853 A | * | 8/2000 | Cox et al. ................... 424/405 |
| 6,110,479 A | * | 8/2000 | Blaney et al. .............. 424/402 |
| 6,193,776 B1 | | 2/2001 | Doetsch et al. |
| 6,280,495 B1 | * | 8/2001 | Doetsch et al. ............. 210/696 |

FOREIGN PATENT DOCUMENTS

| DE | 2622610 A1 | * | 12/1976 | ........... C01B/15/00 |
| DE | 2918137 | | 12/1980 | |
| DE | 3025682 | | 1/1984 | |
| DE | 19650686 | | 2/2001 | |
| EP | 0002543 | | 10/1981 | |
| GB | 2048842 | | 12/1980 | |

* cited by examiner

Primary Examiner—J. J. Swann
Assistant Examiner—Kathy Mitchell
(74) Attorney, Agent, or Firm—Crowell & Moring LLP

(57) ABSTRACT

Coated metal peroxides, their preparation and use, in which metal peroxides are coated with silicone compounds from selected from the group siliconates, hydrogen-polysiloxanes, siloxanes, silicone resin emulsions, silane/siloxane emulsions, silane/siloxane mixtures, silicone microemulsion concentrates, and silicic acid ester mixtures.

5 Claims, No Drawings

COATED METAL PEROXIDES

BACKGROUND OF THE INVENTION

The invention relates to coated metal peroxides, their preparation and use.

Metal peroxides, in particular magnesium, zinc and calcium peroxide or mixed peroxides, are known from the prior art and are used as oxygen donors in numerous applications. Thus alkaline earth peroxides are used for medicinal and pharmaceutical purposes and in cosmetics. Furthermore, the use of the peroxides in toothpastes, for producing bread or for seed preparation is known. The possibility of the slow emission of oxygen of peroxide compounds is also utilized in sewage treatment or in the purification of soil.

Alkali and alkaline earth peroxides are generally prepared by preparing peroxide-containing reaction mixtures from aqueous solutions or suspensions of their salts, oxides or hydroxides by reaction with aqueous hydrogen peroxide solution and drying them.

In Doetsch et al., GB 2,048,842 (=DE 29 18 137), a concentrated alkali or alkaline-earth oxide or hydroxide suspension is reacted with aqueous hydrogen peroxide solution and subsequently is subjected to spray-drying.

It is known from Doetsch et al., U.S. Pat. No. 4,427,644 (=DE 30 25 682), to react a solid, anhydrous or hydrated oxide or hydroxide directly with hydrogen peroxide in an intensive mixer, and to dry the reaction product in a short-retention-time dryer.

Doetsch et al., U.S. Pat. No. 6,193,776 (=DE 196 50 686), describes a process for the preparation of homogenous Ca/Mg peroxides by reacting an aqueous suspension of calcium hydroxide and magnesium oxide and/or magnesium hydroxide with a hydrogen peroxide solution and subsequent drying of the resulting calcium/magnesium peroxide.

It is likewise known to delay the slow release of the oxygen by coating the peroxides.

In accordance with Gago, U.S. Pat. No. 4,293,426, calcium peroxide particles are granulated in the presence of water-insoluble compounds. Organic polymers or inorganic compounds are used here as water-insoluble compounds. These compounds have a solubility in water of less than 1% and a melting point of at least 50° C. Coating of the peroxide particles in this case takes place in a known manner during the granulation process.

SUMMARY OF THE INVENTION

It is the object of the invention to provide metal peroxides which are stable in a moist medium, which greatly reduces the release of oxygen therefrom.

This and other objects are achieved in accordance with the present invention by providing a metal peroxide coated with a coating agent comprising at least one silicone compound selected from the group consisting of siliconates, hydrogen-polysiloxanes, siloxanes, silicone resin emulsions, silane/siloxane emulsions, silane/siloxane mixtures, silicone microemulsion concentrates, and silicic acid ester mixtures.

In accordance with a further aspect of the invention, the objects are achieved by providing a process for coating a metal peroxide comprising providing a suspension of the metal peroxide, while stirring the suspension introducing up to 10% by weight (relative to solids content of the suspension) of at least one silicone compound selected from the group consisting of siliconates, hydrogen-polysiloxanes, siloxanes, silicone resin emulsions, silane/siloxane emulsions, silane/siloxane mixtures, silicone microemulsion concentrates, and silicic acid ester mixtures, and drying the resulting coated metal peroxide.

Another aspect of the invention includes a method of bioremediating soil comprising treating the soil with an effective bioremediating amount of a coated metal peroxide as described above.

The invention involves hydrophobizing the metal peroxide particles by adding a suitable coating agent to a metal peroxide suspension before drying.

The metal peroxide suspension is prepared analogously to the methods described in DE 29 18 137, DE 30 25 682 and DE 196 50 686 by reacting the corresponding metal oxides and/or hydroxides with hydrogen peroxide. The coating agent is mixed directly into the resulting peroxide-containing suspension. The peroxide suspension supplied with the coating agent is dried in a short-retention-time dryer, e.g. spray-dryer. In contrast to U.S. Pat. No. 4,293,426, this ensures that the grain size of the metal peroxides is maintained. No agglomerates are formed. The coating agent directly surrounds the primary grains. Suitable coating agents for use in the invention include silicone compounds selected from the group consisting of siliconates, hydrogen/polysiloxane emulsions, siloxanes, siloxanes on support material, silicone resin emulsions, silane/siloxane mixtures, silicone microemulsion concentrates and silicic acid ester mixtures. In accordance with the invention, coating agent in an amount of up to 10% by weight (relative to the solids content of the suspension) is introduced with stirring into the metal peroxide suspension.

In one embodiment of the invention, a silicone microemulsion concentrate based on silane/siloxane is used as coating agent.

In another embodiment of the invention, silicone microemulsion concentrate composed of silane/siloxane is introduced into the metal peroxide suspension with stirring in a quantity of up to 10% by weight, preferably in a quantity of up to 2% by weight, relative to the solid product.

As used herein, the term "silicone microemulsion concentrate based on silane/siloxane" is understood to refer to a water-dilutable silane/siloxane synthetic resin mixture, preferably an alkyl silicone resin with alkoxy groups, in particular a partially neutralized amino-functional polydimethylsiloxane.

Preferably alkaline-earth oxides and alkaline-earth hydroxides, in particular calcium hydroxide or calcium oxide, magnesium oxide or magnesium hydroxide, are used as metal salts. Zinc oxide is likewise suitable for preparing the peroxides according to the invention.

Optionally, small amounts of the additives and/or stabilizers usually used in the preparation of inorganic peroxygen compounds may additionally be added to the metal peroxide solution. Examples of useful additives include, inter alia, waterglass or conventional active oxygen stabilizers such as commercially available phosphonic acids and salts thereof.

The hydrophobized metal peroxides coated according to the invention are dried in conventional manner by evaporation of the water with simultaneous drying of the reaction product in a short-retention-time dryer. Examples of suitable short-retention-time dryrs include spray-dryers and spin-flash dryers.

The coated hydrophobized metal peroxides may be formulated in a conventional manner depending on the intended use.

It has been found that the metal peroxides coated according to the invention have a considerably delayed release of oxygen compared with the known, untreated products. Owing to the delayed release of oxygen, the peroxides according to the invention are particularly suited to supporting the aerobic process of bioremediation and thus making soil purification more effective.

As a further positive effect, it has been discovered that alkaline earth peroxides hydrophobized according to the invention have improved flow behavior. Owing to their improved flow behavior, these products can, for example, be introduced into the soil very simply and without major technical outlay for the bioremediation of soils.

DETAILED DESCRIPTION OF PREFERRED EMBODIMENTS

The following examples are intended to illustrate the invention in further detail, without limiting its scope.

EXAMPLE 1
Preparation of Hydrophobised $CaO_2$

A $Ca(OH)_2$ suspension which contained 400 g/liter $Ca(OH)_2$ was prepared in a preparation vessel by simultaneously metering in water and $Ca(OH)_2$ powder with stirring. 3,200 liters of this suspension was reacted with 800 liters of 60% stabilized hydrogen peroxide solution in a second reactor to produce $CaO_2$. The temperature of the reaction solution was kept to less than 35° C. by external cooling. Silicone microemulsion concentrate SMK2101 (from Wacker) in an amount of 1% relative to the solids content of the suspension, was added to the fully reacted $CaO_2$ suspension and dried in a spray-dryer at an exhaust-air temperature of 110 to 120° C. The resulting product had a $CaO_2$ content of 79% by weight.

EXAMPLE 2
Preparation of Hydrophobised $MgO_2$

A MgO suspension which contained 300 g/liter of MgO was prepared in a preparation vessel by simultaneously metering in water and MgO powder with stirring. This suspension was reacted with 60% stabilized hydrogen peroxide solution in a second reactor to form $MgO_2$, care being taken that there was always an excess of between 10 g/liter and 50 g/liter $H_2O_2$ in the suspension. The temperature of the reaction solution was kept to less than 20° C. by external cooling. Silicone microemulsion concentrate SMK2101 (from Wacker) in an amount of 2%, relative to the solids content of the suspension, was added to the fully reacted $MgO_2$ suspension and dried in a spray-dryer at an exhaust-air temperature of 140 to 150° C. The resulting product had a $MgO_2$ content of 29.5%.

EXAMPLE 3
Preparation of Hydrophobized Ca/Mg Peroxide

In a reaction vessel in which approximately 1/20 of the total quantity required in the reaction batch of a 60% by weight $H_2O_2$ solution was present as receiving solution, simultaneously a suspension mixture of 12.1 kg $Ca(OH)_2$ and 1.2 kg $Mg(OH)_2$ was reacted with 8.7 kg $H_2O_2$ (60% by weight) and 140 ml sodium-waterglass solution with cooling (temperature maintained less than 40° C.) and stirring. Silicone microemulsion concentrate SMK2101 (from Wacker) in an amount of 1%, relative to the solids content of the suspension, was added to the fully reacted Ca/Mg peroxide suspension having a solids content of 300 g/liter and dried in a spray-dryer at an exhaust-air temperature of 120 to 140° C. The mixed peroxide had a content of 46.2% $CaO_2$ and 4.2% $MgO_2$.

EXAMPLE 4
Determination of the Reactivity 0.5 g of the peroxide sample to be investigated was suspended by means of a magnetic stirrer in 200 ml $NaAsO_2$ solution (0.06 mol/$NaAsO_2$), which had been adjusted to a pH value of 8 by addition of $NaHCO_3$. At set intervals, samples were taken and the excess content of $NaAsO_2$ was back-titrated with iodine solution. The percentage reacted (corresponds to the reactivity) was calculated from the peroxide content which was thus determined and the initial value.

TABLE 1

Determination of the reactivity of calcium peroxide by reaction with $NaAsO_2$ at pH = 8

| Time [min] | without hydrophobization [%] | Hydrophobized with 1% SMK 2101 [%] | Hydrophobized with 2% SMK 2101 [%] |
| --- | --- | --- | --- |
| 1 | 48 | 16 | 15 |
| 2 | 72 | 34 | 27 |
| 3 | 83 | 50 | 37 |
| 5 | 85 | 68 | 51 |
| 7 | 86 | 79 | 58 |
| 9 | 86 | 82 | 66 |
| 10 | 86 | 85 | 70 |

TABLE 2

Determination of the reactivity of magnesium peroxide by reaction with $NaAsO_2$ at pH = 8

| Time [min] | without hydrophobization [%] | Hydrophobized with 2% SMK 2101 [%] |
| --- | --- | --- |
| 1 | 2.3 | 2.3 |
| 2 | 5.7 | 2.3 |
| 2 | 7.7 | 2.3 |
| 5 | 10.9 | 4.6 |
| 7 | 14.5 | 8 |
| 9 | 17.5 | 9.2 |
| 10 | 18 | 12.4 |

EXAMPLE 5
Determination of the Flow Behaviour 50 g of the sample to be investigated was poured into a glass funnel which was closed at its outlet (overall height 300 mm, funnel outlet length 150 mm, outlet diameter 12 mm, upper funnel diameter 150 mm) which was positioned vertically 45 mm above a surface covered with emery cloth. The outlet tube was then opened and the contents of the funnel were allowed to flow out onto the underlying surface. The spreading surface (a in mm²) covered by the sample which had flowed out on the plate was then determined.

TABLE 3

Calcium peroxide flow behavior

| Amount of additive (%) | Amount of spreading (cm²) |
| --- | --- |
| 0 | 39 |
| 1 | 110 |
| 2 | 106 |

TABLE 4

Magnesium peroxide flow behavior

| Amount of additive (%) | Spreading surface (cm$^2$) |
|---|---|
| 0 | 22 |
| 1 | 42 |
| 2 | 46 |

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A metal peroxide coated with a coating agent comprising at least one silicone compound selected from the group consisting of siliconates, hydrogen-polysiloxanes, siloxanes, silicone resin emulsions, silane/siloxane emulsions, silane/siloxane mixtures, silicone microemulsion concentrates, and silicic acid ester mixtures.

2. A coated metal peroxide according to claim 1, wherein the metal peroxide comprises an alkaline earth peroxide.

3. A coated metal peroxide according to claim 2, wherein the alkaline earth peroxide comprises at least one peroxide selected from the group consisting of calcium peroxide, magnesium peroxide, and Ca/Mg mixed peroxide.

4. A coated metal peroxide according to claim 1, wherein the metal peroxide comprises zinc peroxide.

5. A method of bioremediating soil, said method comprising treating said soil with an effective bioremediating amount of a coated metal peroxide according to claim 1.

* * * * *